United States Patent
Obert et al.

(10) Patent No.: US 10,119,211 B2
(45) Date of Patent: Nov. 6, 2018

(54) BINDER COMPOSITION FOR MINERAL WOOL

(71) Applicant: SAINT-GOBAIN ISOVER, Courbevoie (FR)

(72) Inventors: Edouard Obert, Fleurines (FR); Marie Savonnet, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 15/313,342

(22) PCT Filed: Apr. 27, 2015

(86) PCT No.: PCT/FR2015/051135
§ 371 (c)(1),
(2) Date: Nov. 22, 2016

(87) PCT Pub. No.: WO2015/181458
PCT Pub. Date: Dec. 3, 2015

(65) Prior Publication Data
US 2017/0198425 A1    Jul. 13, 2017

(30) Foreign Application Priority Data
May 28, 2014 (FR) ..................... 14 54885

(51) Int. Cl.
| | |
|---|---|
| *D04H 1/4209* | (2012.01) |
| *C03C 25/1095* | (2018.01) |
| *C03C 25/32* | (2018.01) |
| *D04H 1/587* | (2012.01) |
| *C09J 103/02* | (2006.01) |
| *C03C 13/06* | (2006.01) |
| *C03C 25/321* | (2018.01) |
| *C09D 103/02* | (2006.01) |
| *D04H 1/4218* | (2012.01) |
| *D04H 1/64* | (2012.01) |
| *C08K 5/05* | (2006.01) |
| *C08K 5/092* | (2006.01) |
| *C08L 91/00* | (2006.01) |

(52) U.S. Cl.
CPC .......... *D04H 1/4209* (2013.01); *C03C 13/06* (2013.01); *C03C 25/1095* (2013.01); *C03C 25/32* (2013.01); *C03C 25/321* (2013.01); *C08K 5/05* (2013.01); *C08K 5/092* (2013.01); *C08L 91/00* (2013.01); *C09D 103/02* (2013.01); *C09J 103/02* (2013.01); *D04H 1/4218* (2013.01); *D04H 1/587* (2013.01); *D04H 1/64* (2013.01)

(58) Field of Classification Search
CPC ...................................... C03C 13/06
See application file for complete search history.

(56) References Cited

U.S. PATENT DOCUMENTS

| | | | |
|---|---|---|---|
| 2003/0212181 A1* | 11/2003 | Honda ................ | C09D 167/00 524/438 |
| 2004/0097464 A1 | 5/2004 | Robert et al. | |
| 2005/0215153 A1 | 9/2005 | Cossement et al. | |
| 2010/0233146 A1* | 9/2010 | McDaniel ............. | A01N 63/02 424/94.2 |
| 2011/0223364 A1* | 9/2011 | Hawkins ............ | C03C 25/1095 428/34.5 |
| 2012/0037836 A1 | 2/2012 | Hansen | |
| 2014/0076197 A1 | 3/2014 | Hansen | |
| 2014/0364029 A1 | 12/2014 | Hawkins et al. | |

FOREIGN PATENT DOCUMENTS

| | | | |
|---|---|---|---|
| FR | WO2010029266 | * | 3/2010 |
| JP | 2014-62077 A | | 4/2014 |
| WO | 99/56720 A1 | | 11/1999 |
| WO | 02/20622 A1 | | 3/2002 |
| WO | 2010/106181 A | | 9/2010 |
| WO | 2012/118939 A1 | | 9/2012 |
| WO | 2014/038078 A1 | | 3/2014 |

OTHER PUBLICATIONS

International Search Report dated Jul. 21, 2015 in PCT/FR2015/051135 filed Apr. 27, 2015.

* cited by examiner

*Primary Examiner* — Melvin C. Mayes
*Assistant Examiner* — Colette B Nguyen
(74) *Attorney, Agent, or Firm* — Oblon, McClelland, Maier & Neustadt, L.L.P.

(57) ABSTRACT

The present invention relates to an aqueous sizing composition for insulating products based on mineral wool, comprising
(a) at least one carbohydrate chosen from reducing sugars, hydrogenated sugars and a mixture thereof,
(b) at least one polycarboxylic acid or a salt or anhydride of such an acid,
(c) from 1% to 25% by weight, relative to the sum of components (a) and (b), of at least one aliphatic, cycloaliphatic or aromatic monoalcohol free of acid or base functions and having an octanol/water partition coefficient (Log Kow) of between 1 and 3.

21 Claims, No Drawings

BINDER COMPOSITION FOR MINERAL WOOL

CROSS REFERENCE TO RELATED APPLICATION

This application is a National Stage entry under 35 USC 371 of PCT/FR2015/051135, filed on Apr. 27, 2015, and claims priority to French Patent Application No. 1454885, filed on May 28, 2014.

The present invention relates to a composition, in particular a sizing composition for insulating products based on mineral wool, in particular glass wool or rock wool, containing a carbohydrate component, at least one polycarboxylic acid or anhydride and a hydrophobic monoalcohol.

The manufacture of insulating products based on mineral wool generally comprises a step of manufacturing glass fibers or rock fibers via a centrifugation progress. On their path between the centrifugation device and the fiber collection belt, an aqueous sizing composition, also known as a binder, is vaporized onto the fibers while they are still hot, and the composition then undergoes a thermosetting reaction at temperatures of about 200° C.

The phenolic resins that have been used for several decades as binders are increasingly being replaced with products derived from renewable sources and which emit very little or no formaldehyde, which is a compound that is considered as potentially being harmful to human health.

It is thus known practice, for example from US 2011/0 223 364, to bind mineral fibers with aqueous sizing compositions free of formaldehyde, containing, as thermally crosslinkable reagents, carbohydrates and polycarboxylic acids.

Sizing compositions based on reducing sugars have the drawback, however, of giving rise to coloration reactions (caramelization, Maillard reaction) which make it difficult or even impossible to obtain light-colored products.

The Applicant proposed in its patent applications WO 2010/029 266 and WO 2013/014 399, binders not based on reducing sugars, but based on hydrogenated sugars, also known as sugar alcohols. These reagents have considerably higher heat stability than reducing sugars and do not give rise to Maillard reactions and/or to caramelization.

Insulating products based on mineral wool and on this new generation of "green" binders are, however, relatively hygroscopic and conserve their mechanical properties less well over time than the more colored products manufactured with reducing sugars. To compensate for the loss of mechanical properties after a certain period of aging of these insulating products, it is generally necessary to increase the proportion of binder by about 10% to 20%, which not only increases the cost of the final product, but also impairs its reaction to fire.

In the course of its research directed toward improving the mechanical properties of insulating products based on mineral wool sized with "colorless" binders, i.e. manufactured from hydrogenated sugars, the Applicant has found, surprisingly, that certain hydrophobic monovalent alcohols, when incorporated into the binder, lead to a spectacular improvement in the mechanical properties of the insulating products obtained, and especially to excellent regain of thickness. This is true for binders based on hydrogenated sugars, but also, to a lesser extent, for binders containing reducing sugars or non-reducing sugars.

One subject of the present invention is, consequently, an aqueous composition, especially a sizing composition for insulating products based on mineral wool, comprising (a) at least one carbohydrate chosen from hydrogenated sugars, reducing sugars, non-reducing sugars and mixtures thereof, (b) at least one polycarboxylic acid or a salt or anhydride of such an acid, (c) from 1% to 25% by weight, relative to the sum of the components (a) and (b), of at least one aliphatic, cycloaliphatic or aromatic monoalcohol free of acid or base (Bronsted) functions and having an octanol/water partition coefficient (Log Kow) of between 1 and 3.

In the present patent application, the term "carbohydrate" has a broader sense than usually, since it encompasses not only carbohydrates in the strict sense, i.e. reducing sugars or carbon hydrates of formula $C_n(H_2O)_p$ bearing at least one aldehyde or ketone group (reducing group), but also the hydrogenation products of these carbon hydrates in which the aldehyde or ketone group has been reduced to an alcohol. This term also encompasses non-reducing sugars consisting of several carbohydrate units in which the carbons bearing the hemiacetal hydroxyl participate in oside bonds linking the units together.

The carbohydrate component (a) of the sizing composition according to the invention may consist solely of hydrogenated sugars and be free of reducing or non-reducing sugars. This embodiment is advantageous since it leads to insulating products that are particularly sparingly colored.

The insulating products based on mineral wool obtained with a sizing composition having a certain content of reducing sugars are relatively more colored, but may have a real economic advantage linked to the low cost of reducing sugars or of mixtures of incompletely hydrogenated sugars.

In the present invention, the term "hydrogenated sugar" means all of the products resulting from the reduction of a saccharide chosen from monosaccharides, disaccharides, oligosaccharides and polysaccharides and mixtures of these products.

The hydrogenated sugar is preferably a product of hydrogenation of a starch hydrolyzate.

Starch hydrolyzates are products obtained by enzymatic and/or acid hydrolysis of starch. The degree of hydrolysis is generally characterized by the dextrose equivalent (DE), defined by the following relationship:

$$DE = 100 \times \left(\frac{\text{number of broken glycoside bonds}}{\text{number of glycoside bonds in the initial starch}}\right)$$

The preferred starch hydrolyzates have, before the hydrogenation step, a DE of between 5 and 99 and advantageously between 10 and 80.

The hydrogenation of the saccharide may be performed via the known methods working under high hydrogen pressure and high temperature conditions, in the presence of a catalyst chosen from elements from groups IB, IIB, IVB, VI, VII and VIII of the Periodic Table of the Elements, preferably from the group comprising nickel, platinum, palladium, cobalt and molybdenum, and mixtures thereof. The preferred catalyst is Raney nickel. The hydrogenation converts the sugar or the mixture of sugars (starch hydrolyzate) into polyols or sugar alcohols.

Examples of hydrogenated sugars that may be mentioned include erythritol, arabitol, xylitol, sorbitol, mannitol, iditol, maltitol, isomaltitol, lactitol, cellobitol, palatinitol, maltotritol and the hydrogenation products of starch hydrolyzates.

The hydrogenation products of starch hydrolyzates will preferably be used.

Preferably, the hydrogenated sugar or the mixture of hydrogenated sugars consists predominantly, i.e. to more than 50% by weight, of maltitol (product of hydrogenation of maltose, a glucose dimer resulting from the enzymatic hydrolysis of starch).

The carbohydrate component (a) may consist solely of reducing sugars. However, for the reasons indicated in the introduction, it preferably contains a significant fraction of hydrogenated sugars. The proportion of hydrogenated sugars in the carbohydrate is advantageously between 25% and 100% by weight, and component (a) then contains up to 75% by weight of one or more reducing sugars, in addition to the hydrogenated sugar(s).

The content of hydrogenated sugars in the carbohydrate (component (a)) is preferably at least equal to 30% by weight, in particular at least equal to 50% by weight and ideally at least equal to 70% by weight.

The reducing sugars include oses (monosaccharides) and osides (disaccharides, oligosaccharides and polysaccharides).

Examples of monosaccharides that may be mentioned include those comprising from 3 to 8 carbon atoms, preferably aldoses and advantageously aldoses containing 5 to 7 carbon atoms. The aldoses that are particularly preferred are natural aldoses (belonging to the D series), especially hexoses such as glucose, mannose and galactose.

Lactose or maltose are examples of disaccharides that may be used as reducing sugar.

The polysaccharides that may be used for the present invention preferably have a weight-average molar mass of less than 100 000, preferably less than 50 000 and advantageously less than 10 000.

Preferably, the polysaccharide contains at least one unit chosen from the abovementioned aldoses, advantageously glucose. Reducing polysaccharides consisting predominantly (to more than 50% by weight) of glucose units are particularly preferred.

The reducing sugar may especially be a mixture of monosaccharides, oligosaccharides and polysaccharides, especially a dextrin.

Dextrins are compounds corresponding to the general formula $(C_6H_{10}O_5)_n$. They are obtained by partial hydrolysis of starch. Their DE is advantageously between 5 and 99 and preferably between 10 and 80.

The non-reducing sugar is preferably a non-reducing oligoholoside containing not more than ten carbohydrate units.

As examples of such non-reducing sugars, mention may be made of diholosides such as trehalose, isotrehaloses, sucrose and isosucroses, triholosides such as melezitose, gentianose, raffinose, erlose and umbelliferose, tetraholosides such as stachyose, and pentaholosides such as verbascose.

Sucrose and trehalose are preferred, and better still sucrose.

Component (a), namely the carbohydrate consisting of hydrogenated sugars and/or reducing and/or non-reducing sugars, advantageously represents from 30% to 70% by weight and preferably from 40% to 60% by weight of solids of the sizing composition.

The polycarboxylic acid may be an acid polymer or an acid monomer.

To limit the viscosity of the sizing composition, this polycarboxylic acid advantageously has a number-average molar mass of less than or equal to 50 000, preferably less than or equal to 10 000 and advantageously less than or equal to 5000.

Examples of polycarboxylic acid polymers that may be mentioned include homopolymers and copolymers obtained from monomers bearing at least one carboxylic acid group such as (meth)acrylic acid, crotonic acid, isocrotonic acid, maleic acid, cinnamic acid, 2-methylmaleic acid, fumaric acid, itaconic acid, 2-methylitaconic acid, α,β-methyleneglutaric acid and unsaturated dicarboxylic acid monoesters, such as $C_1$-$C_{10}$ alkyl maleates and fumarates. The copolymers may also contain one or more vinyl or acrylic monomers such as vinyl acetate, styrene, which is unsubstituted or substituted with alkyl, hydroxyl or sulfonyl groups, or with a halogen atom, (meth)acrylonitrile, (meth)acrylamide, $C_1$-$C_{10}$ alkyl (meth)acrylates, especially methyl (meth)acrylate, ethyl (meth)acrylate, n-butyl (meth)acrylate and isobutyl (meth)acrylate.

Component (b) is preferably a polycarboxylic acid monomer. It may be a dicarboxylic, tricarboxylic or tetracarboxylic acid.

The dicarboxylic acids include, for example, oxalic acid, malonic acid, succinic acid, glutaric acaid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and derivatives thereof, especially containing at least one boron or chlorine atom, tetrahydrophthalic acid and derivatives thereof, especially containing at least one chlorine atom, such as chlorendic acid, isophthalic acid, terephthalic acid, mesaconic acid and citraconic acid.

The tricarboxylic acids include, for example, citric acid, tricarballylic acid, 1,2,4-butanetricarboxylic acid, aconitic acid, hemimellitic acid, trimellitic acid and trimesic acid.

Examples of tetracarboxylic acids that may be mentioned include 1,2,3,4-butanetetracarboxylic acid and pyromellitic acid.

Citric acid will preferably be used.

Component (b) advantageously represents from 30% to 70% by weight and preferably from 40% to 60% by weight of solids of the sizing composition of the present invention.

The weight ratio of component (a) to component (b) is preferably between 70/30 and 30/70 and in particular between 60/40 and 40/60.

Component (c) of the sizing composition is a relatively hydrophobic monovalent alcohol, i.e. a compound comprising only one C—OH function and having an octanol/water partition coefficient (log P) of greater than 1. The octanol/water partition coefficient of a pure substance X, also known as log P or Log Kow (from Log $K_{octanol/water}$) is the logarithm of the ratio P defined by the following formula:

$$P = [X]_{octanol} / [X]_{aqueous}$$

in which $[X]_{octanol}$ is the concentration of X in octanol saturated with water and $[X]_{aqueous}$ is the concentration of X in water saturated with octanol the two phases being at room temperature and being in contact with each other.

When this partition coefficient has a positive value, the solubility in octanol of substance X is greater than that in water. The higher the value of the partition coefficient, the more a compound is considered as hydrophobic. Reference may be made, for example, to the article by James Sangster entitled "Octanol-Water Partition Coefficients of Simple Organic Compounds" in J. Phys. Chem. Ref. Data, Vol. 18, No. 1989, which contains tables indicating the log P value of more than 600 pure organic compounds.

The monoalcohols of the present invention are free of acid or base functions, in other words they are molecules that are not ionizable in water. Advantageously, their partition coefficient value thus does not depend on the pH of the aqueous phase of the octanol/water two-phase system.

The Applicant thinks that component (c) functions as a hydrophobic agent reacting with components (a) and/or (b) and thus reducing the hydrophilic and/or hygroscopic nature of the final insulating product obtained after crosslinking of the binder. In order to be efficient, this component must, simultaneously, have a high partition coefficient and be sufficiently soluble in the aqueous sizing composition to react with the carboxyl and/or hydroxyl functions of components (a) and (b).

The octanol/water partition coefficient (log P) of component (c) is preferably between 1.05 and 2.0 and in particular between 1.1 and 1.5. When component (c) contains several monoalcohols, the log P value of each of these pure substances must be within the ranges indicated above.

The use of a monoalcohol with a partition coefficient of less than 3, or even less than 2, is also advantageous for health and environmental reasons, since substances of excessively hydrophobic nature have a tendency to accumulate in adipose tissues.

The concentration of component (c) in the sizing composition of the present invention is preferably between 1.5% and 10% by weight and in particular between 2% and 8% by weight, relative to the sum of components (a) and (b).

Use will preferably be made of an aliphatic or cycloaliphatic monoalcohol, mainly for reactivity reasons. Specifically, aromatic alcohols (phenols) are less reactive than (cyclo)aliphatic alcohols, but might be used especially in combination with a component (b) containing activated carboxylic functions, such as anhydride functions.

Examples that may be mentioned of monoalcohols that are suitable for the present invention include 1-pentanol, 3-methyl-1-butanol, 2,2-dimethyl-1-propanol, 2-pentanol, 3-pentanol, 3-methyl-2-butanol, 2-methyl-2-butanol, 2-ethyl-2-propanol, phenol, cyclohexanol, 1-hexanol, 2-hexanol, 3-hexanol, 3,3-dimethyl-2-butanol, benzyl alcohol, 2-methylphenol, 3-methylphenol, 4-methylphenol, cis-2-methylcyclohexanol, trans-2-methylcyclohexanol, 4-methylcyclohexanol, 1-heptanol, 2-heptanol, 3-heptanol, 4-heptanol, 3-methylbenzyl alcohol, 4-methylbenzyl alcohol, 2-ethylphenol, 3-ethylphenol, 4-ethylphenol, 1-phenylethanol, 2-phenylethanol, 2,4-dimethylphenol, 2,5-dimethylphenol, 2,6-dimethylphenol, 3,4-dimethylphenol, 3,5-dimethylphenol, 2,6-dimethylcyclohexanol, 1-octanol, 2-octanol, 4-octanol, 3-phenyl-2-propen-1-ol, 3-phenyl-1-propanol, 2-n-propylphenol, 4-n-propylphenol, 2-isopropylphenol, 2,3,6-trimethylphenol, 2,4,6-trimethylphenol, 1-naphthol, 2-naphthol, 7-phenyl-4,6-diynhept-2-en-1-ol, diphenylmethanol, 2-chlorophenol, 3-chlorophenol, 4-chlorophenol, 2,4-dichlorophenol, 2,5-dichlorophenol, 2,6-dichlorophenol and 1-phenoxy-2-ethanol.

The Applicant has obtained excellent results with 1-phenoxy-2-ethanol.

The sizing composition also preferably comprises an esterification catalyst, which may be chosen from Lewis bases and acids, such as clays, colloidal or non-colloidal silica, organic amines, quaternary ammoniums, metal oxides, metal sulfates, metal chlorides, urea sulfates, urea chlorides and silicate-based catalysts.

The catalyst may also be a compound containing phosphorus, for example an alkali metal hypophosphite, an alkali metal phosphate, an alkali metal polyphosphate, an alkali metal hydrogen phosphate, a phosphoric acid or an alkylphosphonic acid. The alkali metal is preferably sodium or potassium.

The catalyst may also be a compound containing fluorine and boron, for example tetrafluoroboric acid or a salt of this acid, especially a tetrafluoroborate of an alkali metal such as sodium or potassium, a tetrafluoroborate of an alkaline-earth metal such as calcium or magnesium, a zinc tetrafluoroborate and an ammonium tetrafluoroborate.

Preferably, the catalyst is sodium hypophosphite, sodium phosphate or a mixture of these compounds.

The amount of catalyst introduced into the sizing composition generally represents not more than 20% by weight and advantageously from 1% to 10% by weight, relative to the total weight of components (a) and (b).

The sizing composition in accordance with the invention may also comprise the conventional additives below in the following proportions calculated on the basis of 100 parts by weight of component (a)+(b):

from 0 to 2 parts of silane, in particular an aminosilane,
from 0 to 40 parts, preferably from 4 to 25 parts, of an oil or oil emulsion,
from 0 to 5 parts of a silicone,
from 0 to 20 parts of a polyhol other than hydrogenated sugars,
from 0 to 30 parts of urea, preferably 0 to 20 parts,
from 0 to 30 parts of an extending filler (extender) chosen from lignin derivatives such as ammonium lignosulfonate (ALS) or sodium lignosulfonate, and animal or plant proteins.

The role of the additives is known and briefly recalled:

The silane is a coupling agent that is capable of reacting both with the surface of the fibers and with the components of the binder.

The oils are anti-dust agents and hydrophobic agents; urea acts as a plasticizer and also makes it possible to adjust the gel time of the sizing composition so as to avoid pregelation problems; the extending filler is an organic filler that is soluble or dispersible in the sizing composition, which makes it possible especially to reduce the cost thereof.

The reactive silicone is preferably a polydiorganosiloxane bearing at least one hydroxyl (silanol), carboxyl, anhydride, amine, epoxy or vinyl function that is capable of reacting with at least one of the constituents of the sizing composition and/or with the surface silanol groups of glass. The reactive silicone is preferably liquid at room temperature. Its mean molar mass is generally less than or equal to 50 000 and preferably less than or equal to 10 000.

Preferably, the reactive silicone comprises a reactive function, advantageously a silanol function, at each of its chain ends.

The reactive function of the reactive silicone may be blocked with a protecting group which releases said reactive function under the effect of heat. The proportion of reactive silicone in the sizing composition generally ranges from 0.1 to 5 parts, preferably from 0.3 to 3 parts, advantageously from 0.5 to 2.5 parts and better still from 0.7 to 1.8 parts by weight per 100 parts by weight of the sum of components (a) and (b).

The preparation of the sizing composition is performed by simple mixing of the abovementioned constituents with water.

The sizing composition is intended to be applied to mineral fibers, especially glass or rock fibers.

Another subject-matter of the present invention is a process for manufacturing an insulating product based on mineral wool, comprising the application of an aqueous sizing composition as described above to mineral wool fibers, and evaporation of the solvent phase of the aqueous sizing composition and thermal curing of the non-volatile residue of the composition.

Conventionally, the sizing composition is projected by spraying onto the mineral fibers at the outlet of the centrifuge device and before they are collected on the receiving member in the form of a lap of fibers, which is then treated at a temperature allowing the crosslinking of the sizing and the formation of an unmeltable binder. The crosslinking of the sizing according to the invention takes place at a temperature comparable to that of a standard phenol-formaldehyde resin, at a temperature of greater than or equal to 110° C., preferably greater than or equal to 130° C. and advantageously greater than or equal to 140° C.

The sizing composition advantageously has a pH of between 2 and 4, in particular between 2.5 and 3.5 and ideally close to 3.

The sound-insulating and/or heat-insulating products obtained via the process according to the invention from these sized fibers also constitute a subject of the present invention.

These products are generally in the form of a mattress or a felt of mineral wool, of glass or rock, or alternatively a web of mineral fibers, also of glass or rock, intended especially for forming a surface coating on said mattress or on said felt. When component (a) contains a very small proportion of reducing sugars, the products have a particularly advantageous white color.

In addition, the insulating products have great resistance to the growth of microorganisms, especially of molds, which is due to the unfermentable nature of the hydrogenated sugars.

EXAMPLE 1

Sizing compositions comprising the constituents featured in Table 1, expressed in parts by weight, are prepared.

The sizing compositions are prepared by introducing, into a container, water (about 80% of the final composition), the hydrogenated sugar (maltitol syrup), citric acid, sodium hypophosphite (catalyst), the anti-dust oil emulsion, the silicone emulsion and 1-phenoxy-2-ethanol with vigorous stirring.

Glass wool is manufactured via the internal centrifugation technique in which the molten glass composition is transformed into fibers by means of a tool known as a "centrifugation plate", comprising a basket forming a chamber for receiving the molten composition and a peripheral strip pierced with a plurality of orifices: the plate is driven in rotation about its axis of symmetry arranged vertically, the composition is ejected through the orifices under the effect of the centrifugal force and the material which escapes from the orifices is drawn into fibers with the assistance of a stream of drawing gas.

Conventionally, a sizing spraying crown is placed under the fiber-drawing plate so as to regularly distribute the sizing composition over the glass wool that has just been formed.

The mineral wool thus sized is collected on a conveyor belt equipped with internal suction plena which retain the mineral wool in the form of a felt or a lap at the surface of the conveyor. The conveyor then circulates through an oven maintained at 270° C. where the constituents of the sizing polymerize to form a binder. The insulating product obtained has a width of 2.4 m, a nominal density equal to 17.5 kg/m³, a nominal thickness of about 82 mm and a loss on ignition of the order of 5%.

The properties of the sizing compositions featured in Table 1 below are evaluated in comparison with a standard sizing composition containing a phenol-formaldehyde resin and urea (Reference) prepared in accordance with Example 2, test 1 of WO 01/96254 A1.

The tensile strength is measured according to standard ASTM C 686-71T on a sample cut out by stamping in the insulating product. The sample is in the form of a ring 122 mm long, 46 mm wide, with a radius of curvature of the cut of the outer edge equal to 38 mm and a radius of curvature of the of the cut inner edge equal to 12.5 mm.

The sample is placed between two cylindrical mandrels of a test machine, one of which is mobile and moves at constant speed. The breaking force F of the sample is measured and the tensile strength TS, defined by the ratio of the breaking force F (in newtons) to the mass of the sample (in grams), is calculated.

The "thickness recovery" indicates the compressive elasticity of the final product. To measure it, a compressive pressure such that the thickness is reduced to 1/4.8 of its initial value is applied, for a given time—in the present case 90 days. After releasing this compressive pressure, the thickness is again measured. The thickness recovery is the ratio, expressed as a percentage, of the thickness measured after releasing the compressive pressure to the initial thickness.

The tensile strength (TS) is measured immediately after manufacture (TS before aging) and after accelerated aging in an autoclave at a temperature of 105° C. under 100% relative humidity for 15 minutes (TS after aging).

TABLE 1

| Sample | 1 | 2* | Reference |
|---|---|---|---|
| Phenolic resin | — | — | 100 |
| Hydrogenated sugar (Maltilite ® 5575) | 48 | 43.2 | — |
| Citric acid | 52 | 50 | — |
| Sodium hypophosphite | 5 | 5 | — |
| Anti-dust oil emulsion (HydroWax ® 88) | 9.5 | 9.5 | 9.5 |
| Ammonium sulfate | — | — | 3 |
| Silicone emulsion (DC1581) | 2.1 | 2.1 | — |
| Aminosilane | 0.5 | — | 0.5 |
| 2-Phenoxyethanol | — | 6.8 | — |
| TS (in N/g) | | | |
| Before aging | 3.5/5.3 | 3.8/5.3 | 4.2/5.1 |
| After aging | 2.7/3.4 | 2.7/3.4 | 3.7/4.6 |
| Loss on ignition | 5.2/5.2 | 5.2/5.2 | 4.7/4.7 |
| Thickness recovery (%) | | | |
| After 90 days | 95.2/97.8 | 98.1/101.5 | 97.9/100.8 |

*according to the invention

All the tests were performed twice and Table 1 indicates separately the results of the two series of tests.

It may be seen that the thickness recovery of sample 2, prepared in accordance with the invention, shows a thickness recovery after 90 days superior to that of the reference sample, whereas the thickness recovery of the comparative sample 1 is about 2% to 3% less than that of the reference sample.

These results show that the use of 6.8% by weight of phenoxyethanol makes it possible to significantly improve the thickness recovery of a mineral wool mattress manufactured with a hydrophilic binder based on hydrogenated sugars. The use of phenoxyethanol does not appear to have any influence on the tensile strength before or after aging.

The invention claimed is:

1. An aqueous sizing composition for mineral wool-based insulating products, the composition comprising:
   (a) at least one carbohydrate selected from the group consisting of hydrogenated sugars, reducing sugars, non-reducing sugars and mixtures thereof;
   (b) at least one polycarboxylic acid or a salt or anhydride thereon; and
   (c) from 1% to 25% by weight, relative to the sum of the components (a) and (b), of at least one aliphatic, cycloaliphatic or aromatic monoalcohol free of acid or base functions and having an octanol/water partition coefficient Lop Kow of between 1 and 3,
   wherein the aliphatic monoalcohol is at least one selected from the group consisting of 1-pentanol, 3-methyl-1-butanol 2,2-dimethyl-1-propanol, 2-pentanol, 3-pentanol, 3-methyl-2-butanol, 2-methyl-2-butanol, 2-ethyl-2-propanol, 1-hexanol, 2-hexanol, 3-hexanol, 3,3-dimethyl-2-butanol, 1-heptanol, 2-heptanol, 3-heptanol, 4-heptanol, 1-octanol, 2-octanol, and 4-octanol.

2. The composition as claimed in claim 1, wherein the concentration of the monoalcohol (c) is between 1.5% and 10% by weight relative to the sum of components (a) and (b).

3. The composition as claimed in claim 1, wherein the octanol/water partition coefficient of the monoalcohol is between 1.05 and 2.0.

4. The composition as claimed in claim 1, wherein the monoalcohol is at least one selected from the group consisting of aliphatic and cycloaliphatic monoalcohols.

5. The composition as claimed in claim 1, wherein the monoalcohol comprises at least one aromatic ring.

6. The composition as claimed in claim 1, wherein the monoalcohol is 2-phenoxyethanol.

7. The composition as claimed in claim 1, wherein the polycarboxylic acid is a polycarboxylic acid monomer.

8. The composition as claimed in claim 1, wherein the polycarboxylic acid is citric acid.

9. The composition as claimed in claim 1, wherein the proportion of hydrogenated sugars in the carbohydrate is between 25% and 100% by weight.

10. The composition as claimed in claim 9, wherein the carbohydrate contains at least 50% by weight of hydrogenated sugars.

11. The composition as claimed in claim 9, wherein the hydrogenated sugar is at least one selected from the group consisting of hydrogenation products of monosaccharides, hydrogenation products of disaccharides, hydrogenation products of oligosaccharides, hydrogenation products of polysaccharides, and mixtures thereof.

12. The composition as claimed in claim 11, wherein the hydrogenated sugar is a product of hydrogenation of a starch hydrolyzate.

13. The composition as claimed in claim 1, wherein the component (a) and the component (b) each represent independently from 30 to 70% by weight of solids of the sizing composition.

14. A process for manufacturing an insulating product based on mineral wool, the process comprising applying an aqueous sizing composition as claimed in claim 1 to mineral wool fibers, evaporating a solvent phase of the aqueous sizing composition, and thermal hardening a non-volatile residue of the composition.

15. A sound-insulating and/or heat-insulating product obtained via the process as claimed in claim 14.

16. The composition of claim 1, wherein the composition does not contain formaldehyde.

17. The method of claim 14, wherein thermal hardening the non-volatile residue of the composition comprises reacting the at least one monoalcohol (c) with the at least one carbohydrate (a) and the at least one polycarboxylic acid or a salt or anhydride thereof (b), thereby reducing a hydrophilic and/or hygroscopic nature of the insulating product.

18. The composition as claimed in claim 1, wherein the monoalcohol is at least one aliphatic monoalcohol selected from the group consisting of 1-pentanol, 3-methyl-1-butanol, 2,2-dimethyl-1-propanol, 3-pentanol, 3-methyl-2-butanol, 2-methvl-2-butanol, 2-ethyl-2-propanol, 1-hexanol, 2-hexanol, 3-hexanol, 3,3-dimethyl-2-butanol, 1-heptanol, 2-heptanol, 3-heptanol, 4-heptanol, 1-octanol, 2-octanol, and 4-octanol.

19. The composition as claimed in claim 1, wherein the monoalcohol is at least one aromatic monoalcohol selected from the group consisting of phenol, benzyl alcohol, 2-methylphenol, 3-methylphenol, 4-methylphenol, 3-methylbenzyl alcohol, 4-methylbenzyl alcohol, 2-ethylphenol, 3-ethylphenol, 4-ethylphenol, 1-phenylethanol, 2-phenylethanol, 2,4-dimethylphenol, 2,5-dimethylphenol, 2,6-dimethylphenol, 3,4-dimethylphenol, 3,5-dimethylphenol, 3-phenyl-2-propen-1-ol, 3-phenyl-1-propanol, 2-n-propylphenol, 2-isopropylphenol, 2,3,6-trimethylphenol, 2,4,6-trimethylphenol, 1-naphthol, 2-naphthol, 7-phenyl-4,6-diynhept-2-en-1-ol, diphenylmethanol, 2-chlorophenol, 3-chlorophenol, 4-chlorophenol, 2,4-dichlorophenol, 2,5-dichlorophenol, 2,6-dichlorophenol, and 1-phenoxy-2-ethanol.

20. The composition as claimed in claim 1, wherein the monoalcohol is at least one cycloaliphatic monoalcohol selected from the group consisting of cyclohexanol, cis-2-methylcyclohexanol, trans-2-methylcyclohexanol, 4-methylcyclohexanol, and 2,6-dimethylcyclohexanol.

21. An aqueous sizing composition for mineral wool-based insulating products, the composition comprising:
   (a) at least one carbohydrate selected from the group consisting of hydrogenated sugars, reducing sugars, non-reducing sugars and mixtures thereof;
   (b) at least one polycarboxylic acid or a salt or anhydride thereof; and
   (c) from 1% to 25% by weight, relative to the sum of the components (a) and (b), of at least one aliphatic, cycloaliphatic or aromatic monoalcohol free of acid or base functions and having an octanol/water partition coefficient Log Kow of between 1.05 and 2.0.

* * * * *